United States Patent [19]

Chadwick, Jr.

[11] 3,973,754

[45] Aug. 10, 1976

[54] TRANSFORMER CADDIE

[75] Inventor: William H. Chadwick, Jr., Rossville, Ga.

[73] Assignee: Sherman & Reilly, Inc., Chattanooga, Tenn.

[22] Filed: Jan. 30, 1975

[21] Appl. No.: 545,301

[52] U.S. Cl. .............................. 254/139.1; 180/140; 214/394; 280/766

[51] Int. Cl.² .............................................. B60P 1/02

[58] Field of Search ........... 214/394, 396; 180/44 F, 180/79.2 R; 280/150 C; 254/4 R, 139.1

[56] References Cited

UNITED STATES PATENTS

| | | | |
|---|---|---|---|
| 3,397,898 | 8/1968 | Denney et al. | 280/150 C |
| 3,494,492 | 2/1970 | Thiermann | 214/396 |
| 3,509,721 | 5/1970 | Crawford | 180/44 F |

*Primary Examiner*—Robert G. Sheridan
*Attorney, Agent, or Firm*—McCaleb, Lucas & Brugman

[57] ABSTRACT

A transformer caddie comprises: an inverted U-shaped frame having a horizontal top portion and front and rear vertical support means; transformer hoist means mounted substantially at the center of the top portion and being operable to suspend a transformer therebelow; front and rear wheels, preferably comprising front and rear pairs of adjacently disposed wheels; plural wheel mounting bracket means, each being rotatably connected to an associated vertical support means to mount one of the wheels for revolution about a horizontal axis, and also for steering about a steering axis; and steering means for rotating the wheel mounting bracket means to effect steering of the caddie, the steering means preferably comprising independently operable front and rear steering means, each being operable to effect tandem steering of both of an associated pair of wheels. The caddie is operable to efficiently transport and locate transformers and other electrical equipment in inaccessible areas.

1 Claim, 8 Drawing Figures

Fig. 1.
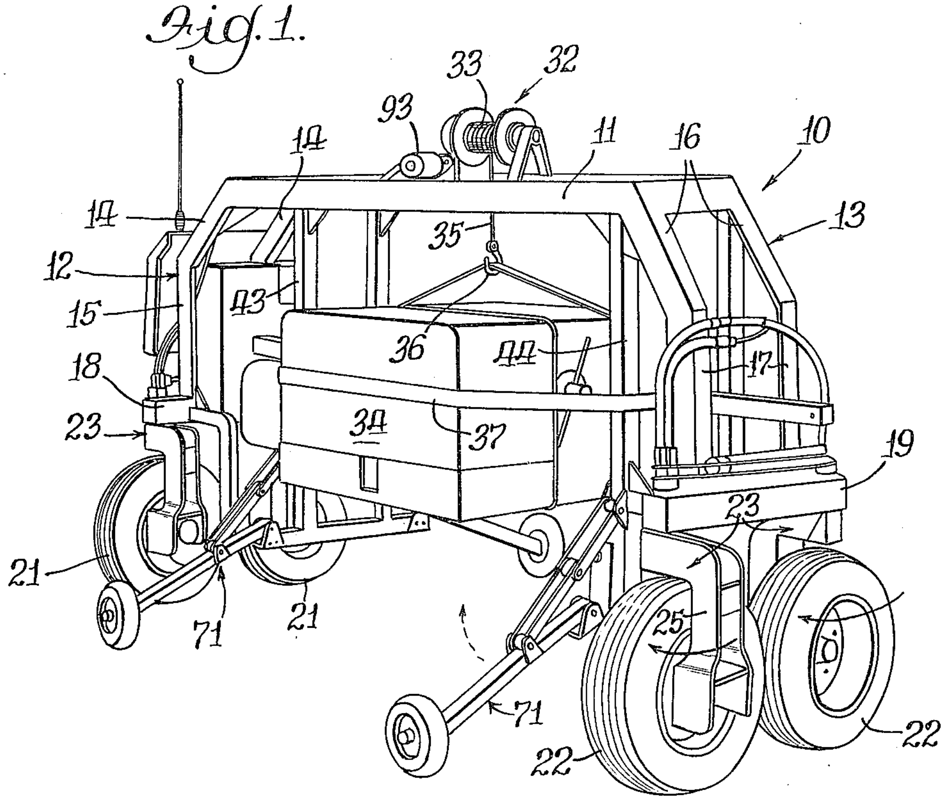
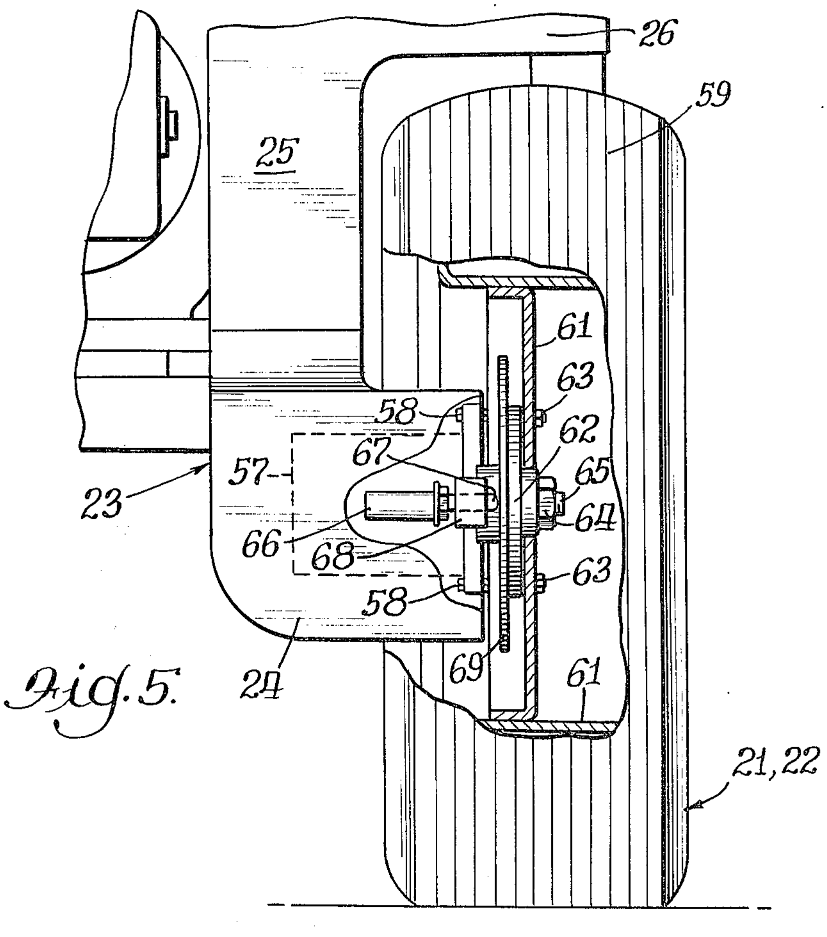
Fig. 5.

TRANSFORMER CADDIE

BACKGROUND OF THE INVENTION

1. Field of the Invention

The present invention relates in general to loadcarrying vehicles, and, more particularly, to a novel transformer caddie for transporting and locating transformers and other equipment.

2. Description of the Prior Art

Modern underground residential distribution systems of electric power frequently include small pad-mounted distribution transformers located in unpaved areas behind homes, usually backyards, these areas being generally inaccessible to trucks and cranes typically employed in transporting and locating transformers and other relatively heavy electrical equipment. Periodic replacement of such transformers has, in the past, presented serious problems, particularly when replacement transformers must be moved through gates or other narrow passageways and into hilly terrain. Furthermore, the problems associated with transformer replacement are aggravated by mud and snow conditions.

One device used for transporting such distribution transformers is a small dolly or wheeled platform. However, since such transformers are frequently quite heavy, often weighing on the order of one ton or more, a rather large work crew has been found to be necessary to wheel and set a transformer into place on its pad using this device.

Another known device is a pole-carrying vehicle comprising an inverted U-shaped frame having a winch mounted on its top for suspending a load, the device having a pair of steerable front wheels similar to those found on a wagon. However, this device lacks maneuverability, particularly necessary for positioning a transformer onto its mounting pad. Furthermore, since this device is rather large, its lack of maneuverability prevents easy movement through narrow passageways.

SUMMARY OF THE INVENTION

The present invention is a simple and inexpensive solution to the above problem. The transformer caddie of the present invention preferably comprises: an inverted U-shaped frame having a horizontal top portion and front and rear vertical support means; transformer hoist means mounted substantially at the center of the top portion and being operable to suspend a transformer therebelow; front and rear wheels, preferably comprising front and rear pairs of adjacently disposed wheels; plural wheel mounting bracket means, each being rotatably connected to an associated vertical support means to mount one of the wheels for revolution about a horizontal axis, and also for steering about a steering axis; and steering means for rotating the wheel mounting bracket means to effect steering of the caddie, the steering means preferably comprising independently operable front and rear steering means, each being operable to effect tandem steering of both of an associated pair of wheels. Thus, a transformer carried by the caddie is easily located on its mounting pad by simply moving the caddie alongside the pad, rotating all of the wheels ninety degrees, moving the caddie laterally to position the transformer directly over its pad, and then simply lowering the transformer into place.

The transformer caddie of the present invention preferably comprises hydraulic motor drive means for effecting automatic caddie movement, and hydraulic brake means connected to each of the wheels. As a result, the present invention enables rapid and efficient transformer replacement in inaccessible areas with a very small work crew, since the caddie can be operated by only one man. The transformer caddie enables considerable savings in manpower, and also minimizes the amount of time required for transformer replacement, thereby increasing the reliability of electric service.

While the transformer caddie can be of any suitable size, it is preferably constructed to be of narrow width to permit easy movement through gates and narrow passageways. Outrigger means pivotally connected to the caddie frame on each side prevent overturning during movement through hilly terrain. Large caddie wheels permit operation in mud and snow and prevent damage to backyard lawns.

BRIEF DESCRIPTION OF THE DRAWINGS

FIG. 1 is a rear elevation view in perspective, illustrating the basic features of the preferred transformer caddie of the present invention, shown carrying a transformer and with its wheels rotated ninety degrees;

FIG. 5 is a detailed elevational view, with parts broken away and with parts in section, of one of the transformer caddie wheels;

DESCRIPTION OF THE PREFERRED EMBODIMENT

Figures 2, 2A:
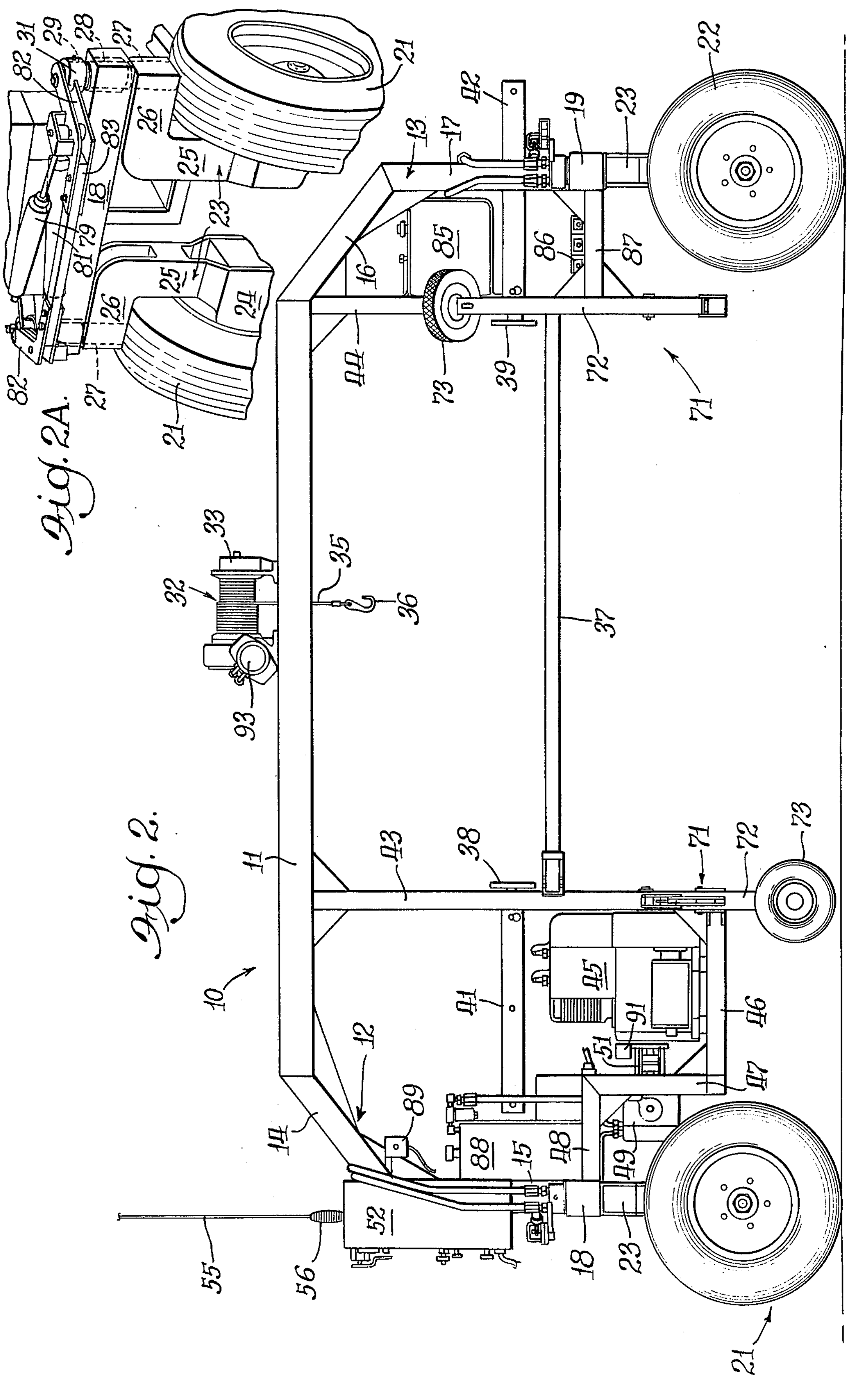
FIG. 2 is a side elevational view of the transformer caddie shown in FIG. 1.
FIG. 2A is a detailed view in perspective of the front caddie steering means shown in FIG. 2.
Figure 4:
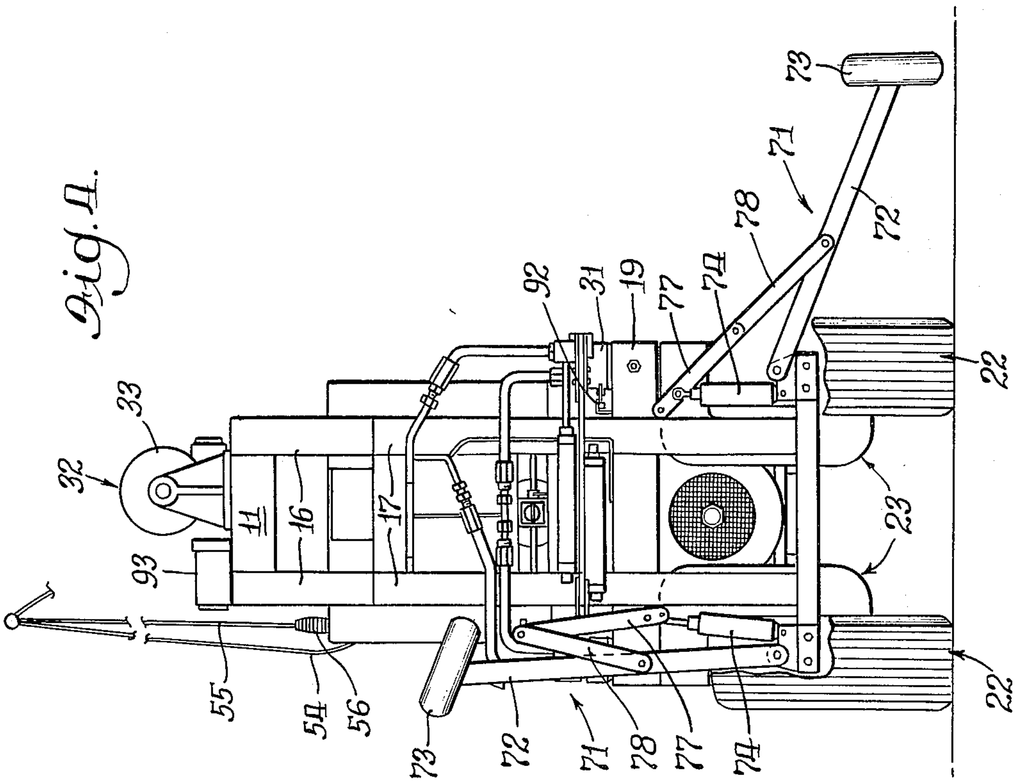
FIG. 4 is a rear elevational view similar to FIG. 3, but with parts broken away to illustrate the details of the outrigger means.

As best seen in FIGS. 1 and 2, a preferred transformer caddie 10 embodying the present invention comprises an inverted U-shaped frame having a horizontal rectangular top frame portion 11 preferably of narrow width and welded or otherwise suitably secured in a well-known manner to a front vertical support means 12 and a rear vertical support means 13. The front vertical support means 12 comprises a pair of upper parallel frame members 14 (FIGS. 1 and 2) downwardly depending from the top portion 11 and angularly related thereto, and suitably joined to a pair of lower front parallel vertical frame members 15. Similarly, the rear vertical support means 13 comprises a pair of downwardly and angularly depending upper frame portions 16 (FIGS. 1 and 2) joined to a pair of lower rear vertical frame members 17. The lower front vertical frame members 15 are securely connected to a front horizontal cross member or frame support tube 18 (FIGS. 1, 2 and 3), and the lower rear vertical frame members 17 are suitably connected to a rear cross member or frame support tube 19 (FIGS. 1, 2 and 4).

Figure 3:
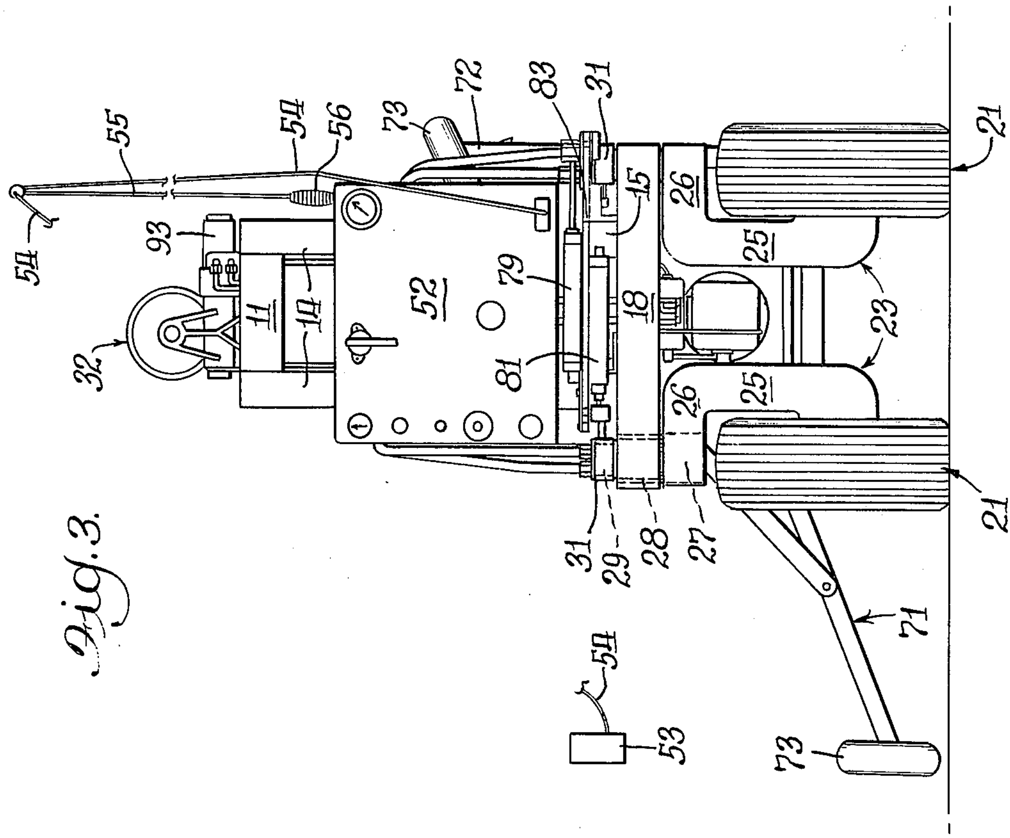
FIG. 3 is a front elevational view of the transformer caddie with its outrigger means on one side extended to a lower position close to the ground, the outrigger means on the other side being collapsed to an upper position.

The preferred transformer caddie 10 comprises a front pair 21 and a rear pair 22 of adjacently disposed wheels (FIGS. 1, 2, 3 and 4), each wheel having an associated wheel mounting bracket means 23 best illustrated in FIGS. 2A, 3 and 5. Each wheel mounting bracket means 23 generally comprises a U-shaped channel having a lower wheel mounting portion 24 (FIGS. 2A and 5), an integral vertical portion 25 and an integral upper horizontal portion 26, the latter for mounting a vertical wheel support column 27 (illustrated in phantom lines in FIGS. 2A and 3). Each wheel support column 27 has an upper shaft portion 28 (FIGS. 2A and 3) suitably journaled within the cross member 18 and having an upper protrusion 29 for engaging a steering arm assembly 31 described in detail later. Each wheel mounting bracket means 23 rotatably connects a wheel 21, 22 to an associated vertical support means 12, 13 for revolution about a horizontal axis, and also for steering about a preferably vertical steering axis. In order to effect rotation of the wheels 21, 22 through 90° to the position shown in FIG. 1, the wheel mounting bracket means 23 are rotated clockwise as viewed from the top of the caddie 10 by steering means to be described.

The transformer caddie 10 further includes load or transformer hoist means 32 (FIGS. 1, 2, 3 and 4) preferably comprising a winch 33 mounted substantially at the center of the top portion 11 of the frame and operable to suspend a transformer 34 therebelow, as shown in FIG. 1, by means of a cable 35 terminating in a hook 36 (FIGS. 1 and 2) for engaging the transformer or transformer support means in a well-known manner. Means for securing the transformer suspended by the winch 33 preferably comprises a sway belt or strap 37 (FIGS. 1 and 2) and a pair of known load stabilizers 38, 39 (FIG. 2) adjustably disposed within horizontal members 41, 42 suitably secured to the front vertical support means 12 and the rear vertical support means 13, respectively. The strap 37 is releasably fastened to a front pair of vertical support bars 43 and a rear pair of vertical support bars 44, these pairs defining the transformer-containing area. Thus when the transformer 34 is suspended by the transformer winch 33 and secured by the strap 37 and the stabilizers 38 and 39, the caddie 10 is operable to transport the transformer to a desired location without danger of caddie instability or overturning due to shifting of the transformer weight.

In order to effect automatic movement of the caddie 10, the present invention preferably includes motor drive means comprising a known gasoline engine 45 (FIG. 2) vertically supported by a platform 46 (FIG. 2) suitably fastened to a vertical member 43 and an inverted L-shaped member having a vertical portion 47 connected to platform 46, and a horizontal portion 48 connected to the front cross member 18. The gasoline engine 45 is connected to a known variable volume, bi-direction hydraulic pump 49 (FIGS. 2 and 3) having a self-contained charge pump or hydro-static transmission (not illustrated) by means of a coupling 51. Pump 49 serves to hydraulically drive hydraulic motor drive means, hydraulic braking means, hydraulic steering means and hydraulic outrigger means, all to be described presently, these hydraulic appliances being suitably controlled by the hydraulic and electric circuits and controls schematically illustrated in FIGS. 6 and 7, the details of which form no part of the present invention. Since such circuits and controls are well-known in the art, a detailed description of their operation is unnecessary. Manually operable control means are provided, including a control panel 52 (FIGS. 2 and 3), and a hand-held remote control box 53 (FIG. 3) connected by means of a control cable 54 to the caddie 10, the cable being vertically suspended by a rod 55 attached to the control panel 52 by means of a spring 56, in order to enable safe and convenient control of the caddie by a workman holding the remote control box 53 while walking or standing alongside the caddie. The motor drive means includes a hydraulic motor 57 (FIG. 5) disposed within the lower portion 24 of each wheel mounting bracket means 23. The lower horizontal portion 24 is partially closed at its outer end, and the hydraulic motor 57 is mounted thereto by means of bolts 58 in a known manner.

Each of the wheels 21, 22 comprises a large tire 59 (FIG. 5) to enable efficient movement of the caddie in mud and snow. Each tire 59 is mounted to a known wheel assembly 61 mounted to a hub 62 by means of bolts 63. A spindle nut 64 threadedly engages the end of a shaft 65 of the motor 57. Connected to the wheels 21, 22 are hydraulic brake means comprising single-acting hydraulic brake cylinders 66, one of which is illustrated in FIG. 5, in known pin and disc locking arrangements for effecting caddie braking by engagement of brake pins 67, each disposed within a bearing block 68, against a brake disc 69.

In order to prevent overturning of the transformer caddie 10 during movement over rough terrain, outrigger means 71 (FIGS. 1, 2, 3 and 4) comprising pairs of outrigger arms 72 pivotally connected to the frame on each side of the caddie 10 are provided, with wheels 73 rotatably connected to the outer portions of each arm 72. The outrigger means 71 are collapsible to an upper position in proximity with the frame of the transformer caddie 10, when not in use, as shown by the rear outrigger means in FIG. 2, and the left outrigger means (viewed from the top of the caddie while looking forward) of FIGS. 3 and 4. The arms 72 are extensible to a lower position in proximity with the ground or caddie-supporting surface, as also seen in FIGS. 2, 3 and 4. However, the outrigger wheels 73 do not engage the ground surface. As best seen in FIG. 4, the position of each outrigger arm 72 connected to the rear of the caddie 10 is determined by operation of a double-acting hydraulic cylinder 74 connected to a bracket 75 in turn suitably fastened to a horizontal cross bar 76, which is attached to the rear vertical support bars 44. Each cylinder 74 has a piston pivotally connected through a trunion to a linkage member 77 in turn pivotally secured to another linkage member 78, the latter being pivotally attached to an associated arm 72. Hydraulically controlled extension and retraction of the piston effect movement of the outrigger arm to upper and lower positions, respectively. The front outrigger means 71 is identical in construction and operation.

In order to effect steering of the transformer caddie 10, steering means are provided for rotating each wheel mounting bracket means 23. A front steering means, identical to a rear steering means although independently operable, effects tandem steering of its associated front pair of wheels 21. As best seen in FIGS. 2A and 3, the front steering means comprises a pair of opposing double-acting hydraulic steering cylinders 79 and 81 attached to the front vertical membes 15 of the front vertical support means 12. The cylinders have opposing pistons hydraulically controlled by the pump 49 and individually connected to a lever 82 (FIG. 2A) secured to an associated steering arm 31, with a link 83 being provided to interconnect the levers. The steering cylinders 79, 81 are disposed in a criss-cross arrangement (FIG. 2A) and alternately push and pull toward and against their respective levers 82 to cooperatively effect tandem rotation of the front steering support columns 27 and hence rotation of the front wheel mounting bracket means 23.

With reference to FIG. 2, a gasoline tank 85 is located at the rear of the caddie 10 and secured to the rear vertical members 44. A bank of three double solenoid valves 86 is conveniently mounted on a cross bar 87 interconnecting cross member 19 with vertical members 44. A hydraulic reservoir 88 is disposed above the cross member 48 at the front of the caddie. An electronic servo controller or amplifier 89 actuated by a potentiometer and switch circuit in the control panel 52 or control box 53 is connected immediately behind the control panel 52, and a servo actuator 91 for the pump 49 and controlled by the servo controller 89 is disposed above the housing for the coupling 51. As best seen in FIG. 4, a microswitch 92 is engaged by a steering arm 31 to actuate control circuitry for automtically straightening the wheels 22 upon release of the steering switches in the control box 53, except when the wheels are in their 90° or FIG. 1 position.

Figure 6:
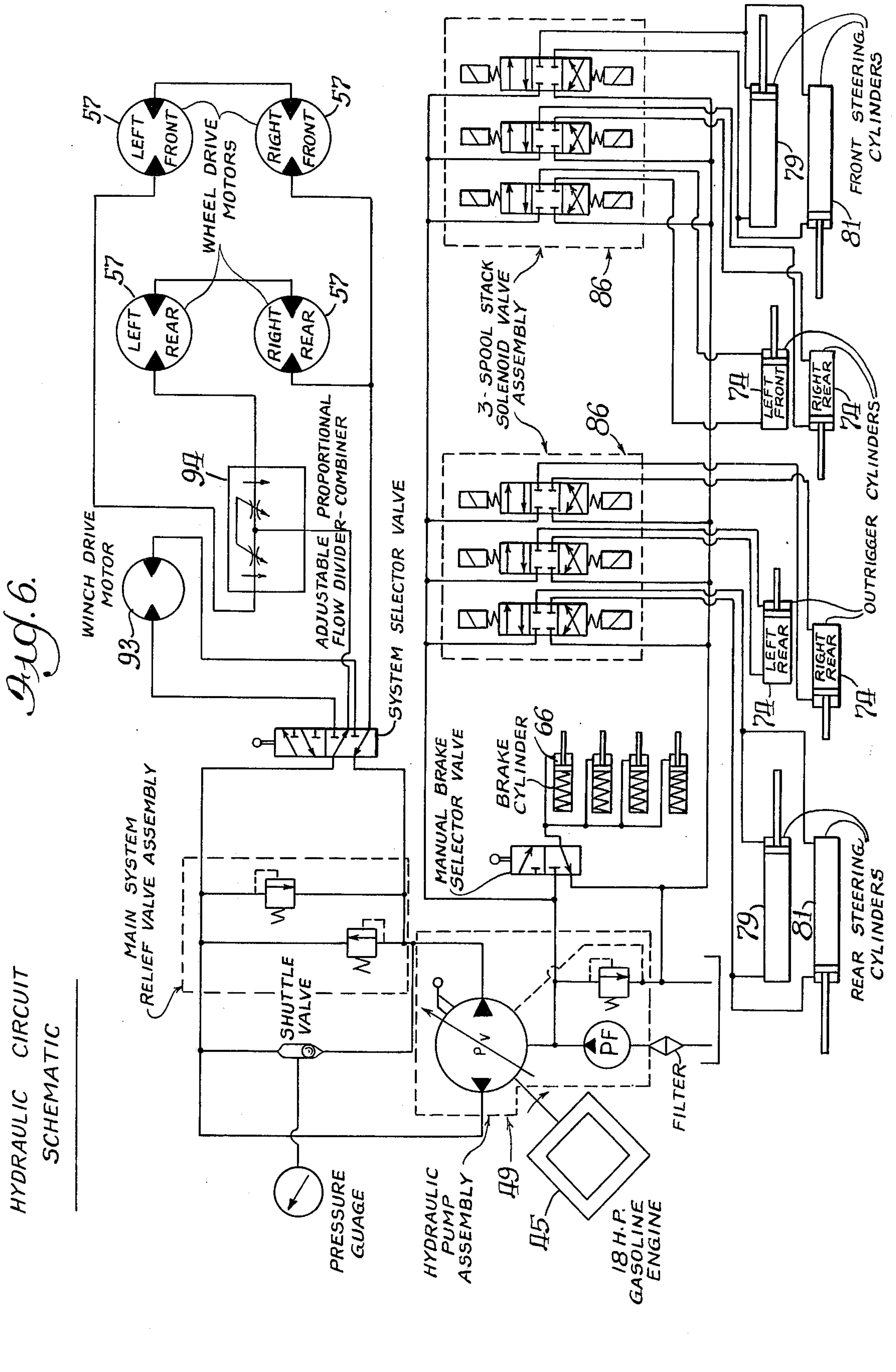
FIG. 6 is a schematic diagram of a typical hydraulic circuit suitable for the transformer caddie.

Turning briefly to FIG. 6, the typical hydraulic circuit schematically illustrated therein comprises suitable known valve means for selectively operating a hydraulic winch drive motor 93 (also seen in FIGS. 1, 2, 3 and 4), and the wheel drive motors 57 through a known differential control on adjustable proportional flow divider-combiner 94 operable to selectively vary the amount of fluid supplied to the front wheel motors with respect to the rear wheel motors, thereby changing their relative speeds. The differential control 94 greatly enhances the maneuverability of the transformer caddie 10, particularly when positioning the caddie over a transformer pad by compensating for lagging or loss of traction of the wheels 21, 22 at one end of the caddie. Furthermore, the differential control 94 can also be used to make very tight turns. FIG. 6 also illustrates the connections from the hydraulic pump 49 to the brake cylinders 66, and to the selectively operable steering cylinders 79, 81 and the independently operable outrigger cylinders 74 through the solenoid valves 86.

Figure 7:
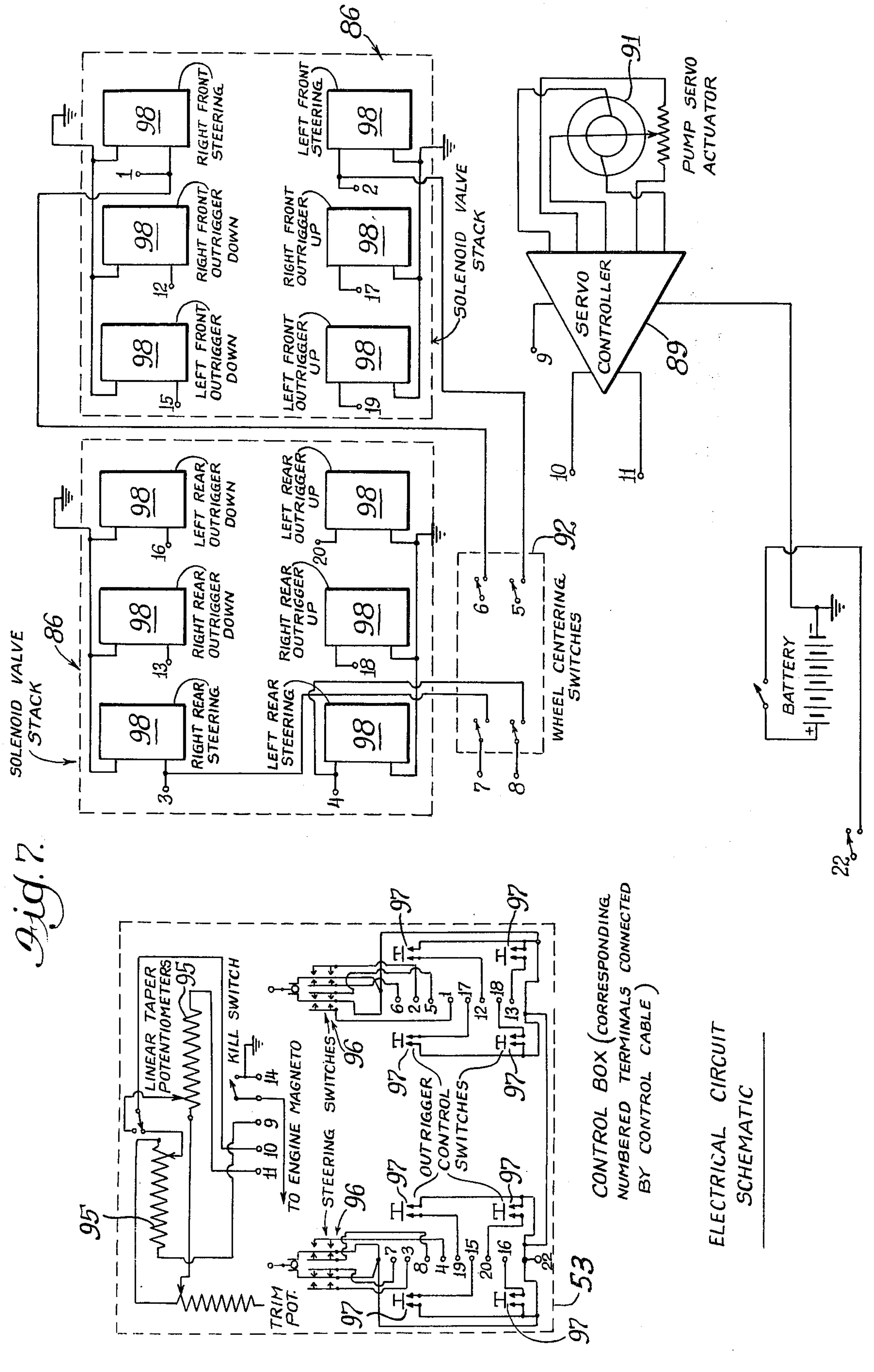
FIG. 7 is a schematic diagram of a typical suitable electrical control circuit.

With reference to FIG. 7, the control box 53 contains a potentiometer and switch circuit including potentiometers 95, steering switches 96 and outrigger control switches 97, this circuit being connected by control cable 54 (not shown in FIG. 7) to solenoids 98 which control the operation of associated solenoid valves 86, to microswitch 92 and to the servo controller 89. The control cable 54 connects terminals correspondingly numbered in FIG. 7.

It is thought that the invention and many of its attendant advantages will be understood from the foregoing description, and it will be apparent that various changes may be made in the form, construction and arrangement of the component parts without departing from the spirit and scope of the invention or sacrificing all of its material advantages, the form described being merely a preferred embodiment thereof.

The embodiments of the invention in which an exclusive property or privilege is claimed are defined as follows:

1. A transformer caddie comprising: an inverted U-shaped frame having a horizontal top portion and front and rear vertical support means; transformer hoist means mounted substantially at the center of said top portion and being operable to suspend a transformer therebelow; a gasoline engine and a hydraulic pump driven thereby; front and rear pairs of adjacently disposed wheels; plural wheel mounting bracket means, each being rotatably connected to an associated said vertical support means to mount one of said wheels for revolution about a horizontal axis and for steering about a steering axis; and independently operable front and rear steering means for rotating said wheel mounting bracket means in said front and rear pairs, respectively; each of said front and rear steering means comprising a pair of hydraulic steering cylinders attached to an associated said vertical support means, a pair of steering arms, and linkage interconnecting said arms, each of said arms being connected to a said wheel mounting bracket means, and said cylinders having opposing pistons hydraulically controlled by said pump and individually connected to said arms.

* * * * *